United States Patent [19]

Chemizard et al.

[11] 4,261,406

[45] Apr. 14, 1981

[54] EXPANDABLE RADIAL CARCASS SPARE TIRE

[75] Inventors: Andre Chemizard, Clermont-Ferrand; Jean-Baptiste Marc, Mozac, both of France

[73] Assignee: Compagnie Generale des Establissements Michelin, Clermont-Ferrand, France

[21] Appl. No.: 43,384

[22] Filed: May 29, 1979

[30] Foreign Application Priority Data

Jun. 5, 1978 [FR] France ................. 78 16984

[51] Int. Cl.$^3$ .................. B60C 9/20; B60C 13/00
[52] U.S. Cl. .................. 152/353 R; 152/359; 152/361 R; 156/123 R
[58] Field of Search ........ 152/330 RF, 352 R, 352 A, 152/353 R, 353 C, 353 G, 361 R, 354 R, 354 RB, 355, 356 R, 356 A, 357 R, 358–359; 156/123 R

[56] References Cited

U.S. PATENT DOCUMENTS

| 1,388,382 | 8/1921 | Schwartz | 425/35 |
| 3,090,189 | 5/1963 | Boussu et al. | 57/311 X |
| 3,090,190 | 5/1963 | Boussu et al. | 57/311 X |
| 3,404,720 | 10/1968 | Fletcher | 152/354 |
| 3,486,546 | 12/1969 | Sidles et al. | 152/354 X |
| 3,540,510 | 11/1970 | Smithkey | 152/352 |
| 3,756,883 | 9/1973 | Gay | 156/123 R |

Primary Examiner—John T. Goolkasian
Assistant Examiner—Lois E. Boland
Attorney, Agent, or Firm—Brumbaugh, Graves, Donohue & Raymond

[57] ABSTRACT

A spare tire which is expandable by inflation, having a radial carcass reinforcement anchored to at least one bead ring in each bead and having a tread reinforcement formed of at least two plies of cables which are parallel in each ply and crossed from one ply to the next and form acute angles with the longitudinal direction of the tire, is improved due to the fact that the plies are composed of cables whose elasticity decreases as the inflation pressure increases and as the tire passes from the collapsed condition to the expanded condition ready for travel.

3 Claims, 6 Drawing Figures

EXPANDABLE RADIAL CARCASS SPARE TIRE

The present invention relates to tires having a radial carcass reinforcement anchored to at least one bead ring in each bead and having a tread reinforcement formed of at least two plies of cables which are parallel in each ply and crossed from one ply to the other and form acute angles with the longitudinal direction of the tire.

More particularly, the invention concerns tires mounted on a wheel rim capable of taking up reduced space in deflated condition and of assuming their final axial width and diameter under the effect of the pressure of the inflation air, so as to serve as spare tires for replacement of tires forming normal equipment of a vehicle.

It is known from U.S. Pat. No. 1,388,382 to vulcanize a tire having a bias carcass reinforcement in a mold which imparts a sinuous meridian profile to the sidewalls of the tire. When the tire, mounted on a rim, is inflated, it is expanded radially and the sinuosities of the sidewalls disappear. Upon deflation, the sinuosities of the sidewalls reappear and the tire resumes its original unexpanded profile under the action of the elasticity of the rubber.

A number of spare tires which are expandable in accordance with the above principle have been marketed. Their carcass reinforcement is of the bias type. Now the high road-holding ability of the radial tires with which vehicles are now equipped prohibits the simultaneous use, even temporarily, of a bias tire and a radial tire, in order to avoid jeopardizing safety or violating the law.

A spare tire with radial carcass reinforcement and with tread reinforcement formed of at least two plies of wires or cables which are parallel to each other in each ply and crossed from one ply to the other and form acute angles with the longitudinal direction of the tire, which is molded and vulcanized in accordance with the known principle described above, is not radially expandable. In fact, the tread plies constitute a nondeformable triangulated unit with the radial carcass reinforcement.

The object of the present invention is to manufacture a tire with a radial carcass reinforcement and a tread reinforcement, which tire can be unfolded radially by inflation, so as to form a radial tire which, after its expansion, has properties comparable to those of the customary radial tires which it is called upon to replace.

The solution consists, in principle, of providing a tread reinforcement which stretches in the longitudinal direction without contracting in the axial direction during the expanding of the tire as a result of the inflation pressure and therefore without subjecting the cables of the radial carcass reinforcement to compressive stresses.

In accordance with the invention, a radial tire of the type in question is characterized by the fact that the plies of the tread reinforcement are reinforced with cables whose curve of relative elongation under tension presents two consecutive segments, a first segment extending from a relative elongation of zero up to a relative elongation of $$a = (\sin \alpha_0 / \sin \alpha_1) = (R_1/R_0)(\cos \alpha_0 / \cos \alpha_1)$$

and a second segment starting from the point of elongation a, the variation of the tensile force as a function of the elongation being low along the first segment and high along the second segment so that the cables, starting from the point of elongation a, have the tensile strength of ordinary cables.

In the foregoing, $R_0$ is the radius of the tread reinforcement of the unexpanded (noninflated) tire and $R_1$ that of the tire expanded (inflated) to its profile of use; $\alpha_0$ is the acute angle of the cables of the tread ply with respect to the longitudinal direction of the tire when the tire is unexpanded and $\alpha_1$ is the same angle when the tire is expanded.

Thus, when the tire is inflated to its pressure of use in order to serve as a spare tire and the tread reinforcement has reached the radius $R_1$, the cables of the tread reinforcement have reached the above relative elongation a and a customary stiffness. On the other hand, the tread reinforcement, while stretching by a length $2\pi(R_1 - R_0)$ has retained the width which it occupied initially when its radius was equal to $R_0$.

The figures of the drawing illustrate the principle of the invention and embodiments thereof with reference to the description given below. In the drawing.

Figure 1:
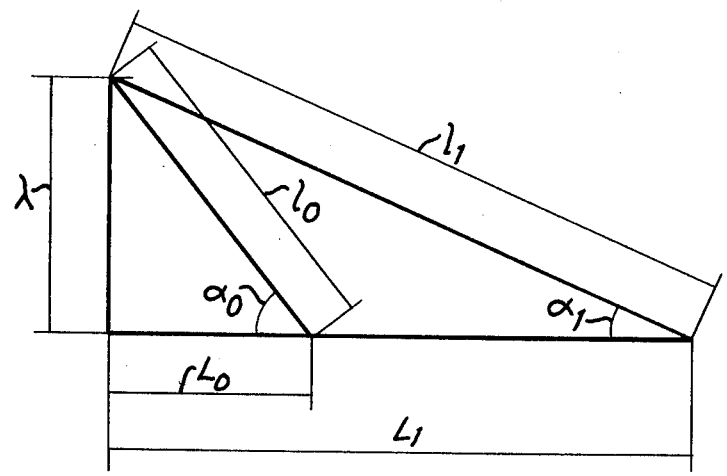
FIG. 1 shows schematically the relative longitudinal lengthening of the tread reinforcement without axial contraction thereof.

In FIG. 1, $L_0$ represents symbolically the length of the tread reinforcement of the tire in accordance with the invention in folded (unexpanded) condition, and $L_1$ the length of the tread reinforcement under the pressure of use of the expanded tire. Before expansion, the cables of the tread ply form an acute angle $\alpha_0$ with the longitudinal direction of the tire; after expansion, the angle $\alpha_0$ has become the angle $\alpha_1$. The relative elongation A of the tread reinforcement is equal to $(L_1/L_0)=(R_1/R_0)$, the ratio of the radii of the tread reinforcement after and before the expansion. The relative elongation a of a cable from the length $l_0$ to the length $l_1$ is equal to $(\sin \alpha_0/\sin \alpha_1)$. $\lambda$ being the axial width of the tire tread, which is constant in accordance with the invention, one also has $$A = \tan \alpha_0/\tan \alpha_1 = a \cos \alpha_1/\cos \alpha_0 = R_1/R_0$$

and $$a = R_1 \cos \alpha_0/R_0 \cos \alpha_1.$$

The above equations make it possible, on the one hand, to select a suitable tread ply angle $\alpha_1$ (between 15° and 30°) so that the tire in accordance with the invention, when expanded, has the road behavior of a radial tire and in particular a suitable traction. Satisfactory results have been obtained for $\alpha_1 = 23°$.

Figure 2:
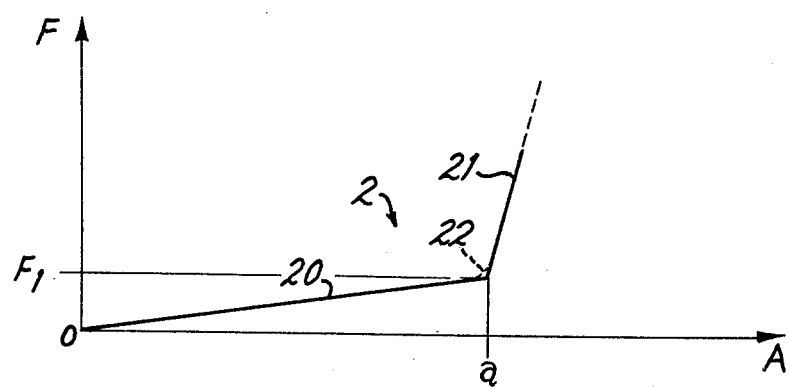
FIG. 2 is a relative elongation diagram of a cable which is suitable for the present invention.

On the other hand, the above equations make it possible to determine the relative elongation a of the cables upon the expansion of the tire of radius $R_0$ to radius $R_1$. In FIG. 2, the value a is reached at the end of the segment 20 of the curve of the tensile forces F as a function of the relative elongations A, coming from the point $A=0$, $F=0$. The tensile force upon expansion $F_1$ is relatively slight, as well as the slope of the segment 20.

Starting from the point A=a, F=F$_1$ the segment 21 of curve 2, in accordance with the principle of the invention, has a very high slope, corresponding to the tensile strength of an ordinary textile or metal cable. This in order to impart to the spare tire the behavior of the customary tire which it is to replace temporarily. In order to simplify FIG. 2, segments 20 and 21 are linear, and the point a, F$_1$ is an angle point. Actually, the two segments 20, 21 are slightly curved and the point a, F$_1$ is formed of a short strongly curved connecting segment 22, shown in dashed line.

Figure 5:
FIGS. 5 and 6 represent segments of cables of large initial relative elongation.
Figure 6:
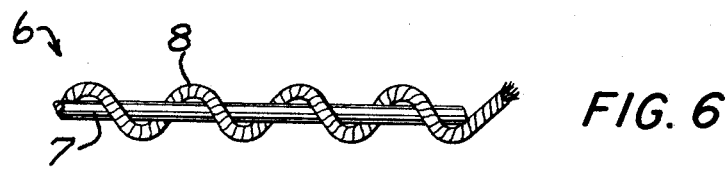

Use may be made of metal cables of the elastic type produced by overtwisting and then undertwisting in order to impart to them a certain spacing, and of strands made from steel wires of small diameter, in accordance with U.S. Pat. Nos. 3,090,189 and 3,090,190. However, it is also possible to use ordinary steel cables 5 which have been undulated (FIG. 5) before forming plies therefrom by coating them by calendering with an elastomer. One could also use cables 6 (FIG. 6) formed of a core 7 around which there has been helically wound an ordinary metal or textile reinforcing cable 8 with suitable pitch. The core 7 can be so designed that it has a low rupture force. As a variant, the core 7 may be very stretchable, being for instance of polyamide. When the tire is expanded, this very stretchable core 7 winds itself around the cable 8.

Figure 3:
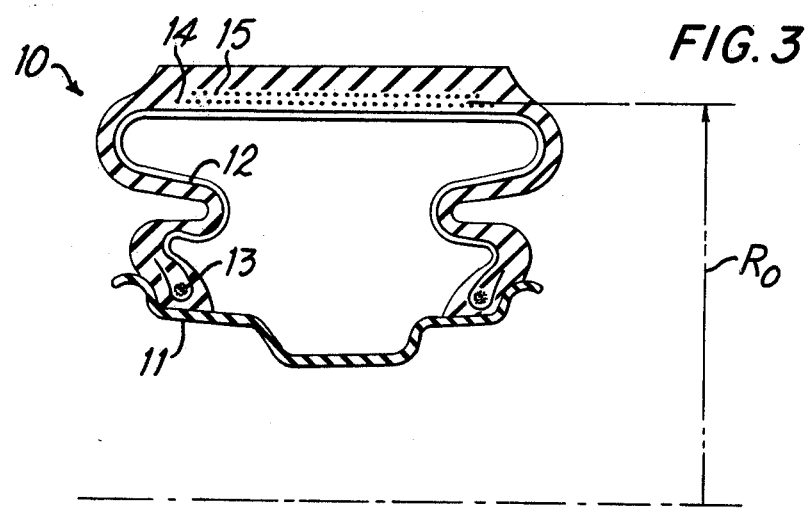
FIGS. 3 and 4 are radial or meridian cross sections or profiles of a tire in accordance with the invention before (FIG. 3) and after (FIG. 4) inflation.
Figure 4:
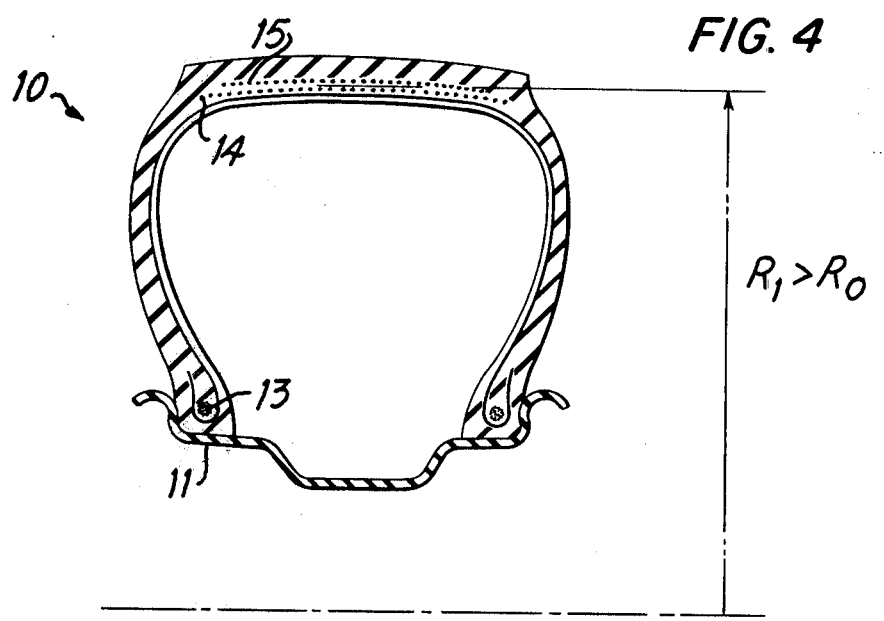

The spare tire 10 of the invention can be vulcanized in accordance with the meridian profile shown in FIG. 3, which corresponds to the unexpanded (folded) condition of radius R$_0$. When this tire is mounted on a rim 11 and inflated, it assumes the radius R$_1$>R$_0$ (FIG. 4) corresponding to the tire which it is intended to replace. The spare tire 10 has a radial carcass reinforcement 12 anchored to bead rings 13. The tread reinforcement is formed of two superposed plies 14, 15 of crossed wires or cables which form preferably equal angles with the longitudinal direction. When the tire 10 is deflated, it returns to the folded meridian profile shown in FIG. 3 under the effect of the tension of the reinforcement elements, added to that of the rubber of which this tire is made.

What is claimed is:

1. A spare tire which is expandable by inflation, having a radial carcass reinforcement anchored to at least one bead ring in each bead and having a tread reinforcement formed of at least two plies of cables which are parallel in each ply and crossed from one ply to the other and form acute angles with the longitudinal direction of the tire, said tire having sidewalls with a sinuous meridian profile before expansion and a normal profile after expansion under the effect of the inflation pressure, characterized by the fact that the plies of the tread reinforcement are reinforced with cables whose curve of relative elongation under tension presents two consecutive segments, a first segment extending from a relative elongation of zero to a relative elongation of $$a = (\sin \alpha_0 / \sin \alpha_1) = (R_1/R_0)(\cos \alpha_0 / \cos \alpha_1)$$

and a second segment starting from the point of elongation a, the variation of the tensile force as a function of the elongation being low along the first segment and high along the second segment so that the cables, starting from the point of elongation a, have the tensile strength of ordinary cables, $\alpha$ being the acute angle of the cables of the tread ply with respect to the longitudinal direction of the tire, R being the radius of the tread reinforcement with respect to the axis of rotation of the tire, and the subscripts 0 and 1 appended to $\alpha$ and R corresponding to the unexpanded condition (zero inflation pressure) and the expanded condition, respectively, of the tire under the effect of the inflation pressure, the angle $\alpha_1$ corresponding to the expanded condition of the tire being between 15° and 30°, and further characterized by the fact that the tire is vulcanized in unexpanded condition corresponding to the radius R$_0$ of the tread reinforcement and by the fact that in expanded condition the tread reinforcement has lengthened by a length $2\pi(R_1-R_0)$ while its width has not changed.

2. The tire according to claim 1, characterized by the fact that the angle $\alpha_1$ corresponding to the expanded condition of the tire is equal to 23°.

3. The tire according to claim 1 or claim 2, characterized by the fact that the cables in the plies of the tread reinforcement are steel cables of the elastic type, metal or textile cables which are undulated before calendering, or cables wound helically around a core which has a low rupture strength or is very extensible.

* * * * *